A. W. A. FRIBERG.
ELECTRICAL MEAT BLOCK CLEANER.
APPLICATION FILED FEB. 20, 1914.
1,115,301.
Patented Oct. 27, 1914.
2 SHEETS—SHEET 1.
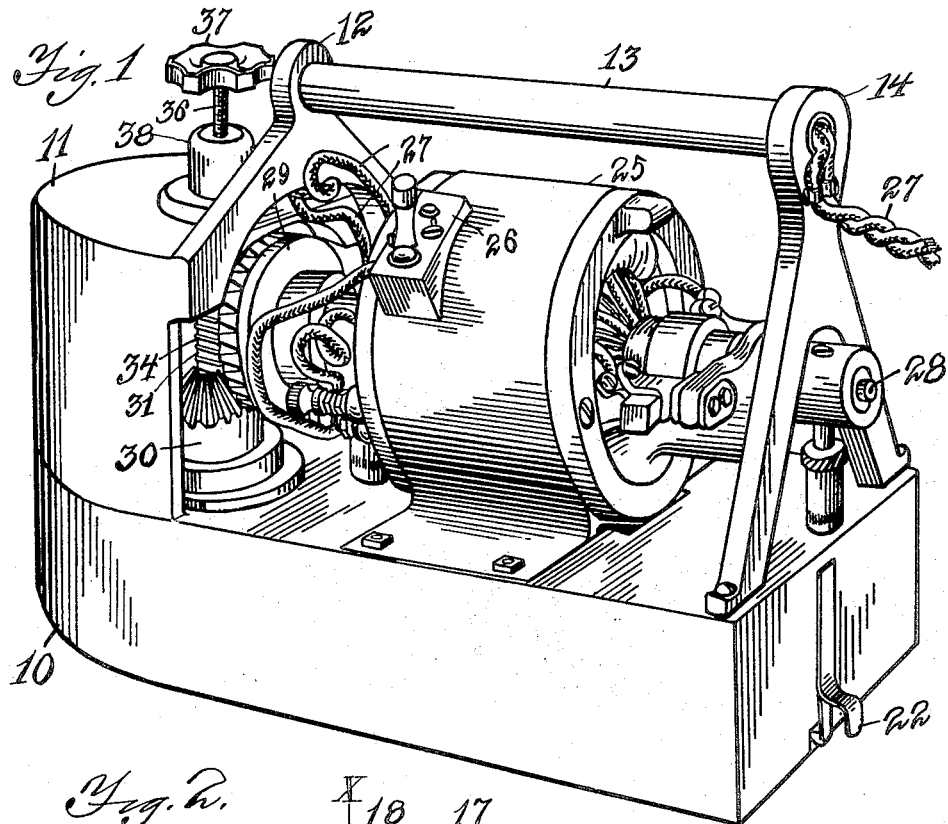
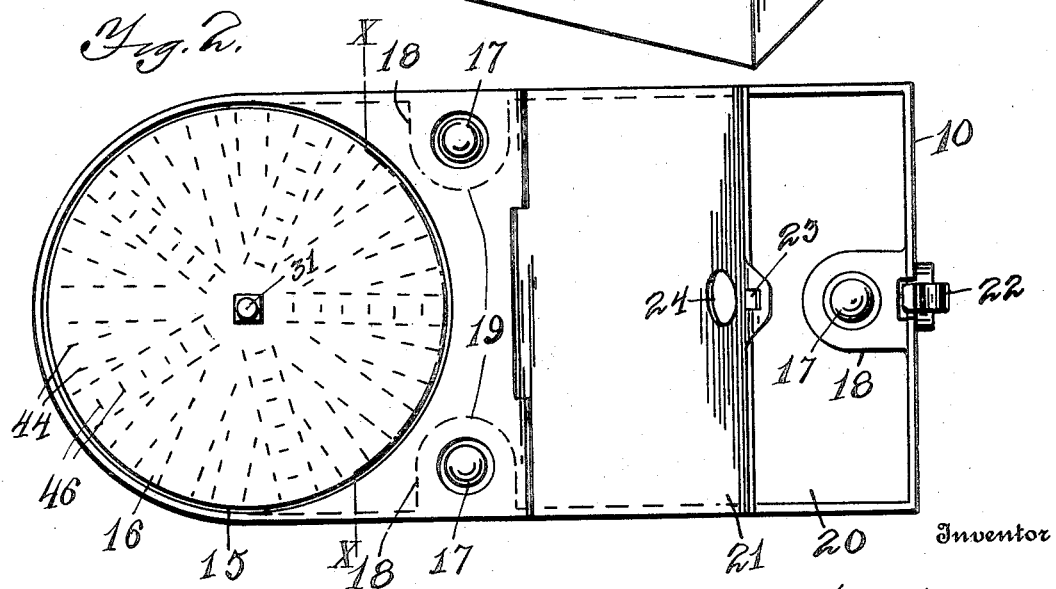
Witnesses
Harold Forsberg
H. A. Sandberg
Inventor
Alrick W. A. Friberg
By S. Arthur Baldwin.
Attorney A. W. A. FRIBERG.
ELECTRICAL MEAT BLOCK CLEANER.
APPLICATION FILED FEB. 20, 1914.
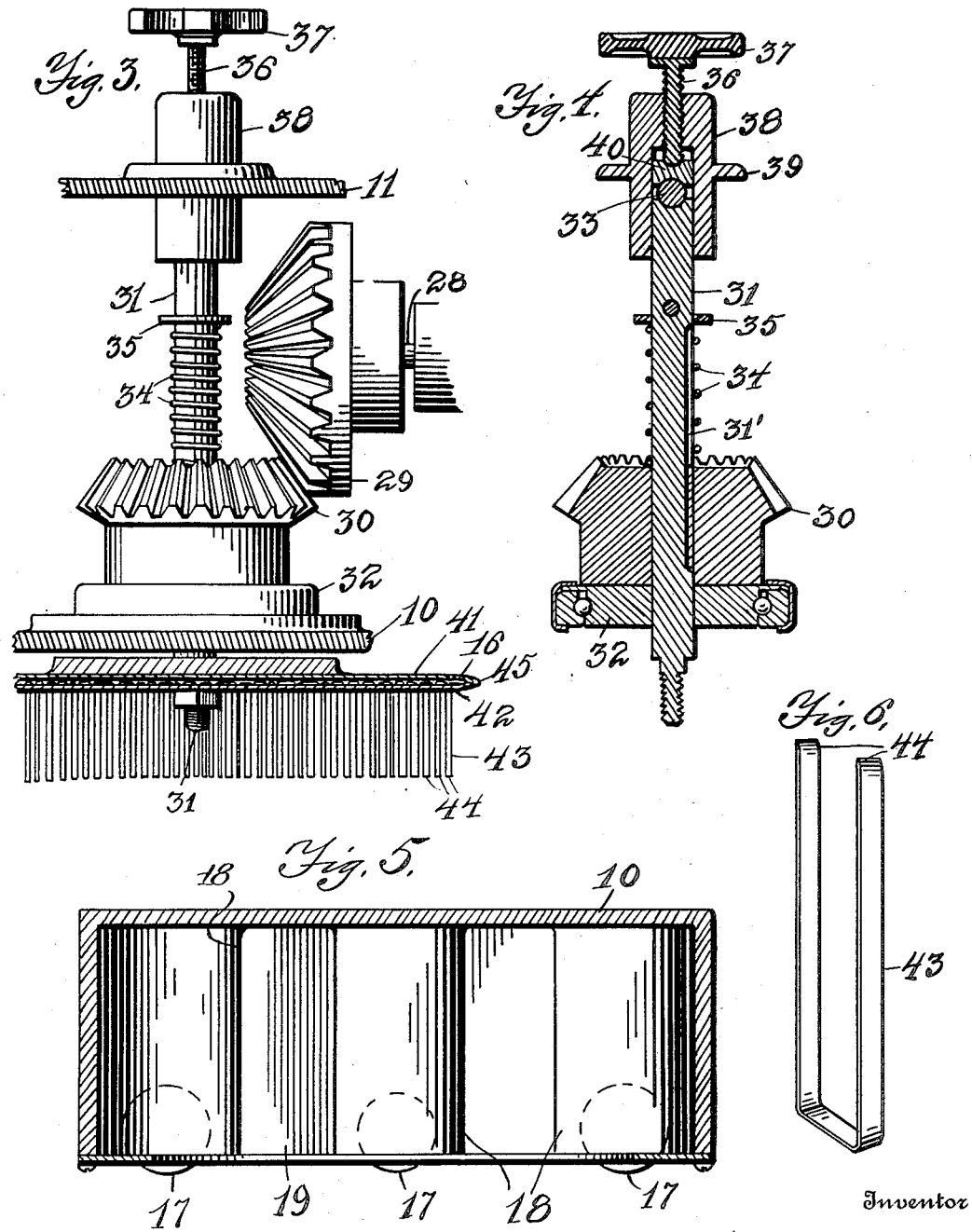

UNITED STATES PATENT OFFICE.

ALRICK W. A. FRIBERG, OF JAMESTOWN, NEW YORK.

ELECTRICAL MEAT-BLOCK CLEANER.

1,115,301.　　　　Specification of Letters Patent.　　Patented Oct. 27, 1914.

Application filed February 20, 1914. Serial No. 819,866.

*To all whom it may concern:*

Be it known that I, ALRICK W. A. FRIBERG, a citizen of the United States, residing at the city of Jamestown, in the county of Chautauqua and State of New York, have invented certain new and useful Improvements in Electrical Meat-Block Cleaners, of which the following, taken in connection with the accompanying drawings, is a specification.

The invention relates to machines for cleaning and polishing meat blocks, and the object of the invention is to provide a simple and durable construction of an electrically driven brush machine by means of which the surface of a meat block may be quickly and efficiently cleaned, the surface of the block being scraped and cut by the rotary brush and the scrapings collected by the machine, so that the entire work is accomplished in a rapid and cleanly manner. The device is equally applicable to polishing floors or other surfaces that need to be cleaned or polished, different forms of cutters being used for this purpose; and the invention consists in the novel features hereinafter set forth and claimed.

In the drawings, Figure 1 is a perspective view of the meat block cleaner ready for use, showing the electric motor and the driving gears for rotating the cutter or brush. Fig. 2 is a plan view of the under side of the meat block cleaner, showing the brush and the apartment which receives the scrapings from the meat block. Fig. 3 is an elevation of the driving mechanism including the beveled gears for rotating the brush, with the brush in section. Fig. 4 is a vertical sectional view of said driving mechanism, showing the ball bearings and adjustment mechanism. Fig. 5 is a sectional view of the casing at line X X in Fig. 2, showing the opening into the apartment for the scrapings from the meat block. Fig. 6 is a perspective view of one of the U-shaped cutters which form the teeth of my peculiar form of brush.

Like numerals of reference refer to corresponding parts in the several views.

The numeral 10 designates the casing, which is preferably made of cast metal and has the hooded or covered end 11 attached thereto to support and cover the driving mechanism. The hooded end 11 has the upward extension 12 to support one end of the tubular handle 13, the other end of the handle being supported by the bracket 14 which is attached to the opposite end of the casing 10. The casing 10 is arranged on its under side with a round opening 15 near one end for the circular brush 16, and has the ball casters 17, preferably three in number, arranged as shown. The ball casters 17 are mounted in the lower ends of the three vertical pillars 18 on the inner side of the casing 10. The three casters 17 permit of a pivotal or circular movement of the cleaner as well as long straight strokes by the same. The space between the two pillars 18 adjacent the circular opening 15 and the top and bottom plates of the casing form a mouth 19 therebetween through which the scrapings or cuttings from the meat block are thrown by the whirling brush 16 into the apartment 20, which apartment 20 is opened for cleaning by means of the hinged door 21 which has a spring catch 22 on the casing 10 to engage the opening 23 on the door 21, the door 21 having also a hole 24 to receive the ball caster 17 therethrough at that end of the casing 10. It is apparent that the cuttings will be thrown into the apartment 20 and that it may be quickly emptied by simply dropping the door 21, and that none of the cuttings or scrapings will be thrown out with the door 21 closed during the block cleaning operation.

An electric motor 25 is mounted on the top of the casing 10 beneath the handle 13 in a suitable casing. The casing for the motor 25 bears a switch 26 preferably on its left side in close proximity of the thumb of the operator of the machine as he grasps the tubular handle 13 so that he may quickly and conveniently turn the electric current on or off from the motor 25. The motor is connected to the source of supply by means of electric wires 27 which preferably pass through the tubular handle 13 and extend by means of a sufficient length of electric cable to permit the free use of the device in moving it about the meat block or surface to be polished or cleaned.

The motor 25 rotatably supports the shaft 28 which bears thereon within the hooded end 11 the bevel gear 29 which meshes in a bevel gear 30 on a vertical shaft 31. The shaft 31 is rotatably supported in the hooded end 11 and casing 10, preferably by means of ball bearings 32 and 33. The ball bearing 32 rests upon the upper surface of the casing 10 with the bevel gear 30 immediately above the same. The bevel gear 30 is mounted on the shaft 31 by means of a feather key in a vertical groove 31' so that the bearing 32 and bevel gear 30 may move upward and downward on said shaft while said gear rotates said shaft. A coil spring 34 is provided on the shaft 31 bearing against the upper side of the bevel gear 30 at one end and against a projecting washer 35 at the other end. This arrangement provides a constant resilient pressure on the brush 16, the tension of which pressure may be adjusted by means of the screw 36 in the upper end which has the hand wheel 37 for controlling the same. The screw 36 is mounted in the plate 38 which is supported on the hooded portion 11 by means of the flange 39. Screw 36 bears against the block 40 which is hollowed out slightly to receive the end of the screw 36 on one side and on the other to receive the ball 33, the upper end of the shaft 31 being hollowed out slightly to form the other bearing for the ball 33, thereby forming a single ball bearing for the upper end of the rod 31.

The brush 16 is attached to the lower end of the shaft 31 by means of a thread and nut or any other suitable manner which will fixedly hold the brush. The brush 16 is preferably made with a head formed of two metal plates 41 and 42. The teeth 43 are formed U-shaped, as shown in Fig. 6, so as to form two connected teeth. The plate 42 is perforated at spaced distances to hold the teeth 43 in fixed relation to the plate 42. The teeth 43 are made of flat strips of spring steel and have the ends 44 sharpened to an edge. The perforations in the plate 42 are preferably made so as to hold the teeth 43 with the flat side of said teeth toward direction of rotation. This constantly wears the ends 44 to a sharp edge which scrapes the surface clean. A portion of the teeth 43 may be placed with the edge toward the direction of rotation when it is desired to cut the surface instead of scrape the same, the rows of cutters being inserted as shown at 46 in Fig. 2. The cutting teeth 46 should however be shorter than the scraping teeth. After the teeth 43 are inserted through the perforations in the plate 42 the two plates 41 and 43 are attached to one another at 45 around their outer edges by spot welding or some other equally efficient holding means. It is apparent that when so welded together the two plates 41 and 42 will effectually lock the teeth 43 firmly in position, holding them so rigidly that the spring of the steel scraping and cutting teeth is effectually brought into effective action on the surface in scraping and cleaning the meat block.

It is apparent that the electrical connection 27 having been made with the source of electric supply, the current may be turned on by means of the switch 26, thereby turning brush head 16 at a rapid rate which quickly cleans the surface, the exact pressure or tension of the teeth 43 being adjusted by means of the set screw 36. It is also obvious that the cleaner may be moved about freely upon the roller bearings 17, quickly cleaning the entire surface of the meat block.

I claim as new:

1. A machine of the class described comprising a casing having a handle extending over the same and an opening on its under side, a motor mounted under said handle on said casing, a horizontal shaft in said motor to be rotated thereby and a bevel gear on said shaft, a vertical shaft revolubly mounted in said casing and a bevel gear on said vertical shaft meshing in said first bevel gear to turn said vertical shaft, said casing having a receptacle with a mouth alongside said opening in the under side, and a device on the lower end of said vertical shaft to be rotated thereby in said opening in the under side of said casing.

2. A machine of the class described comprising a casing having a handle thereto and an opening on its under side, a motor mounted on said casing, a horizontal shaft in said motor to be rotated thereby, a bevel gear on said shaft, a vertical shaft revolubly mounted in said casing, a bevel gear on said vertical shaft meshing in said gear on said horizontal shaft, a brush on the lower end of said vertical shaft to be rotated thereby and extending through said opening in the bottom of said casing, and a receptacle for the cleanings of said brush in said casing alongside said brush.

3. A machine of the class described comprising a casing having a handle thereto and an opening on its under side, a motor mounted on said casing, a horizontal shaft extending through said motor to be rotated thereby, a bevel gear on said shaft, a vertical shaft revolubly mounted in said casing, a bevel gear on said vertical shaft meshing in said gear on said horizontal shaft, a brush on the lower end of said vertical shaft extending through said opening in the bottom of said casing, a receptacle for the cuttings or scrapings of said brush in said casing alongside said brush, and means for the endwise adjustment of said vertical shaft and brush in said casing.

4. A machine of the class described comprising a casing having a handle thereto and an opening on its under side, ball casters on the under side of said casing, a motor mounted on said casing, a horizontal shaft extending through said motor to be rotated thereby, a bevel gear on one end of said shaft, a vertical shaft revolubly mounted in said casing, a bevel gear on said vertical shaft meshing in said bevel gear on said horizontal shaft, a spring tooth brush on the lower end of said vertical shaft to be rotated thereby and extending through said opening in the bottom of said casing, a coil spring on said shaft to give a resilient pressure to said brush, and a receptacle for the cuttings or scrapings of said brush in said casing alongside said brush.

5. A machine of the class described comprising a casing having a handle thereto and an opening on its under side, three ball casters on the under side of said casing, a motor mounted on said casing, a horizontal shaft extending through said motor to be rotated thereby, a bevel gear on one end of said shaft, a vertical shaft revolubly mounted in said casing, a bevel gear slidably mounted on said vertical shaft to mesh in said gear on said horizontal shaft, a spring tooth cutting or scraping brush on the lower end of said vertical shaft extending through said opening in the bottom of said casing, a coil spring on said shaft to give a resilient pressure on said brush, a receptacle for the cuttings or scrapings of said brush in said casing alongside said brush, a spring latch door on said casing for said receptacle, and an adjusting screw bearing on the upper end of said vertical shaft to adjust the pressure of said brush, said vertical shaft having ball bearings.

In testimony whereof I have affixed my signature in the presence of two witnesses.

ALRICK W. A. FRIBERG.

Witnesses:
H. A. SANDBERG,
EDWIN A. JOHNSON.